Figure 1:
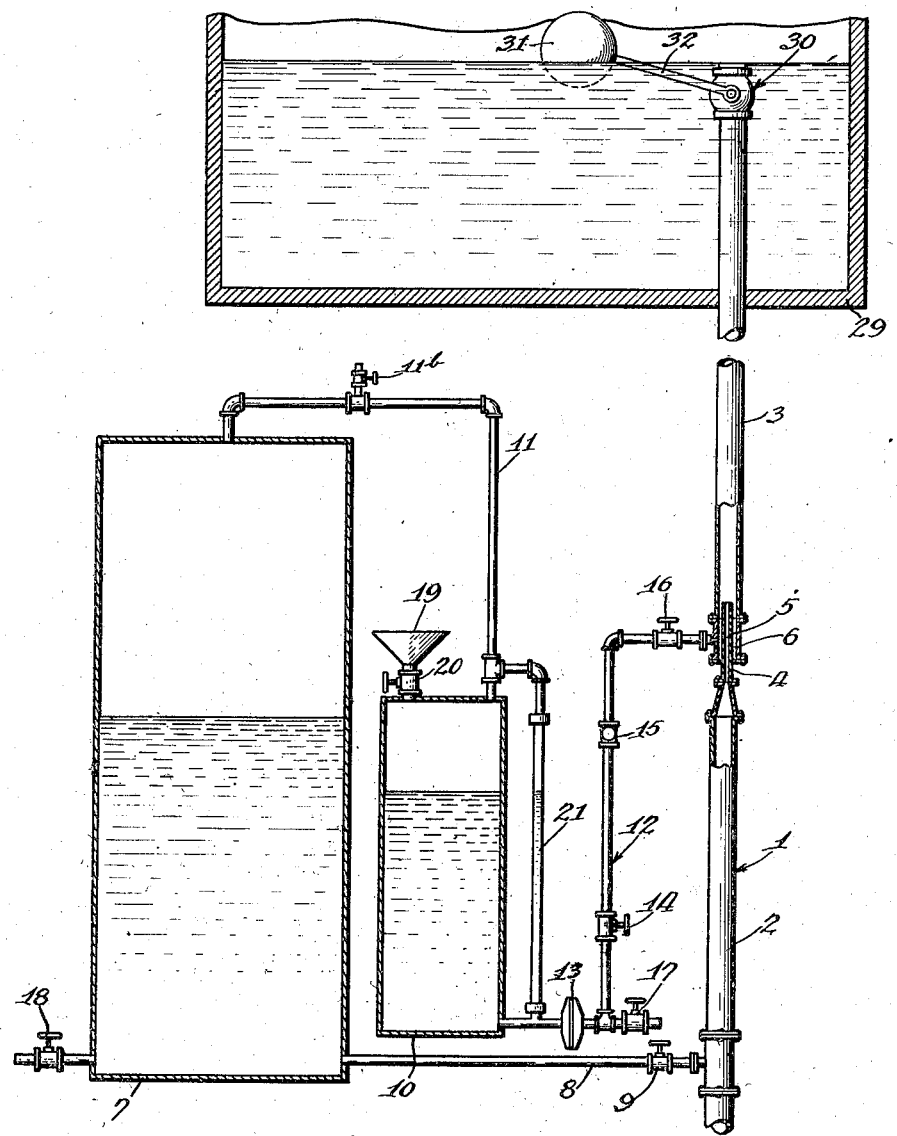

Dec. 15, 1936.                L. B. PAINE                 2,064,627
                             LIQUID FEEDER
                         Filed Feb. 2, 1934            2 Sheets-Sheet 1

Inventor:
Louis B. Paine
By Jones, Addington, Ames & Seibold
Attys.

Dec. 15, 1936.  L. B. PAINE  2,064,627
LIQUID FEEDER
Filed Feb. 2, 1934   2 Sheets-Sheet 2

Inventor:
Louis B. Paine.
By Jones, Addington, Ames & Seibold
Attys.

Patented Dec. 15, 1936

2,064,627

UNITED STATES PATENT OFFICE 2,064,627

LIQUID FEEDER

Louis B. Paine, Big Spring, Tex., assignor to National Aluminate Corporation, Chicago, Ill., a corporation of Delaware Application February 2, 1934, Serial No. 709,483

4 Claims. (Cl. 210—31)

This invention relates to a method and apparatus for mixing a liquid in predetermined quantities with another liquid while the latter is flowing through a conduit, and it has special reference to a method and apparatus whereby one liquid may be injected into another liquid flowing through a conduit or main in a quantity proportional to the flow of the liquid through said conduit, the intermixing of these two liquids being automatically stopped when the flow of the liquid through the conduit ceases.

While the means and method herein disclosed are adaptable for use for various purposes and in various capacities, it is particularly useful for injecting a solution, such as a water softening agent, into a water main leading to a water storage tank such as is used for supplying water to the boilers of railway locomotives. In such installations the inlet to the storage tank may be supplied with an automatic control mechanism whereby a predetermined water level may be constantly maintained in the storage tank. Therefore, the water which is led to the storage tank in a suitable main or conduit may intermittently flow therethrough and into the tank, or the rate of flow through the main may be variable.

It is an object of the present invention to provide an efficient automatic means and method whereby a liquid solution, such as a water softening agent, may be injected into water that is flowing through a main in proportion to the rate of flow therethrough and wherein the flow of the solution to the water flowing in the main is automatically varied in accordance with variation of the flow and is automatically stopped when the flow is stopped, thereby always maintaining in the storage tank a predetermined percentage of the solution per unit volume of water contained in the storage tank.

Broadly, the invention comprises a pressure by-pass including a volume of solution for automatic delivery at the low pressure end of the by-pass and in an arrangement whereby water is prevented from mixing with the volume of solution in the by-pass. In other words, the invention contemplates utilizing the pressure difference between two spaced points in a water conduit or main to compress a volume of air which, in turn, reacts on a volume of liquid to cause a predetermined percentage flow of said liquid solution into the flowing water at the low pressure point.

A further object is to provide a device which is of simple construction, entirely automatic in operation after once adjusted, and which will not easily get out of order and may be applied to substantially any water main in which a pressure flow may be controlled either automatically or manually.

Further objects will be apparent from the specification and the appended claims.

Figure 2:
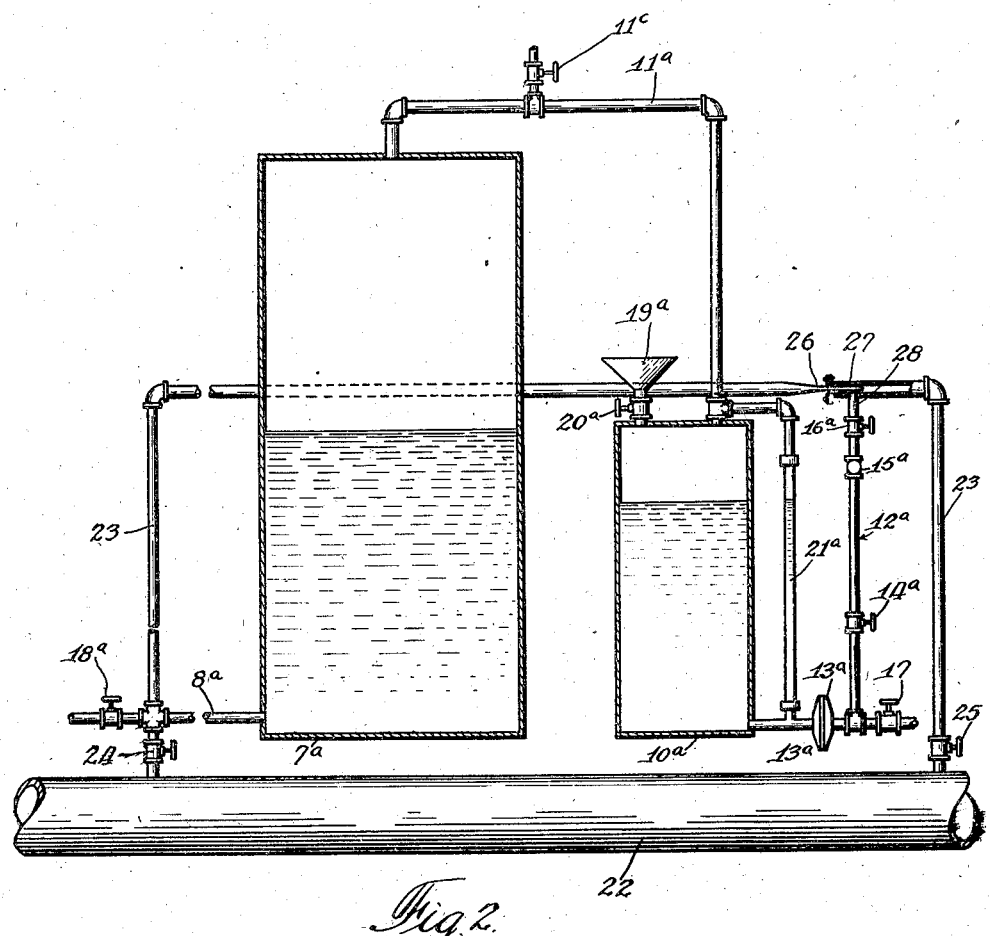

In the drawings:

Figure 1 is an elevation, partly in section, of one embodiment of the invention as applied to a vertical water main; and Fig. 2 illustrates the invention as adapted for use in connection with a horizontal water main.

Referring to the drawings in detail, the embodiment illustrated in Figure 1 comprises a water main 1 which may be arranged for either continuous or intermittent water flow therethrough, and the flow may be either uniform or variable. In the present instance, this water main comprises a lower section 2 and an upper section 3. The section 2 is provided with a nozzle 4 extending into the section 3 and having a restricted passage 5 therethrough. The restricted nozzle 4 extends far enough into the section 3 to provide a chamber 6 around the nozzle and between the nozzle and the walls of the main and wherein the flow of water through the restricted passage 5 and the section 3 of the main will tend to reduce the pressure.

An air tank or drum 7 is connected to the main by means of a pipe 8 which is positioned some distance below the nozzle and provided with a valve 9. Although this is termed an air tank, it will be partially filled with water during the operation of the device.

The upper end of a solution tank 10 communicates with the upper portion of the air tank 7 through a suitable conduit 11. A conduit 12 is connected adjacent the bottom of the solution tank 10 and communicates with the space or chamber 6 in the main below the end of the nozzle 4. This conduit 12 contains, in series, a strainer 13, a regulating valve 14, a check valve 15 and a shut-off valve 16. The water pressure from the main against the check valve 15 prevents the flow of solution therethrough when water is not flowing in the main.

A drain valve 17 is provided for the solution tank, and a similar drain valve 18 is provided for the air tank. A funnel 19 and valve 20 are provided at the top of the solution tank whereby solution may be added thereto as desired. A gauge glass 21 is connected between the conduits 12 and 11 in a manner to constantly indicate the height of the supply of solution in the tank 10.

In operating the device, the solution tank may be substantially filled, preferably with a sodium aluminate solution although any other suitable solution may be used, and the valves 9 and 16 are opened to allow water and solution, respectively, to flow therethrough. The regulating valve 14, which is preferably of the needle valve type, may be accurately adjusted to permit a predetermined flow of solution therethrough when water is flowing in the main 1. When all of the valves are properly adjusted and water is flowing in this main, the difference in the pressures obtaining therein at the conduit 8 and at the chamber 6 adjacent the nozzle 5 will cause water to be forced into the air tank 7 through the pipe 8 and this, in turn, will cause the solution to be drawn through the conduit 12 and into the main 1 adjacent the nozzle 5. A volume of air is thereby trapped under pressure in the upper portions of both tanks 7 and 10 and in the connecting pipe 11 in accordance with the pressure in the main; and when water is flowing in the main the reduced pressure around the nozzle 4 automatically sets up a predetermined flow of solution through the conduit 12 and into the chamber 6 of the main 3 where it is mixed with the water flowing therethrough. The percentage of solution per unit volume of water flowing in the main may be accurately controlled by adjustment of the regulating valve 14.

When no water is flowing, the pressure adjacent the nozzle 4 and at the conduit 8 leading to the air tank is substantially the same. The body of solution, therefore, in the tank 10 will be balanced between these two forces, and there will be no flow of solution into the main. The body of air entrapped in the top portions of both tanks 7 and 10 and the pipe 11 or between the water and the solution acts as a cushion or bumper and transmits the pressure of the water from the air tank to the solution and prevents water from the conduit 8 entering the solution tank through the conduit 11. The check valve 15 prevents water from the main entering the solution through the pipe 12 when no water is flowing in the main.

When water is allowed to flow in the main 1, the pressure obtaining in the chamber 6 adjacent the nozzle 4 is appreciably lessened and in actual practice often becomes less than atmospheric pressure by reason of the water jet passing through the nozzle 4. Therefore, the solution from the tank 10 quickly moves in the direction of this lower pressure and the predetermined amount of solution per unit volume of moving water in the main enters the main adjacent the water jet. By this means a predetermined percentage ratio of solution and water may always be maintained in a suitable storage tank supplied from the main, either intermittently or otherwise and irrespective of pressure or rate of flow.

It is desirable that the nozzle 4, or other equivalent means for providing a point of reduced pressure in the main through which the water is delivered to the storage tank, should be positioned above the top of the solution in the tank 10, and it is preferable that the ratio of the volume of the air tank 7 to the volume of the solution tank 10 should be not less than 5 to 1. This approximate ratio and the approximate positioning of the nozzle and jet and connections thereto have been found to give satisfactory results. But it is apparent that the aforesaid ratio of tank volumes may be varied within wide limits, depending in some respects upon the pressure head that ordinarily exists in the main 1 near the pipe 8.

In Fig. 2 the device is illustrated as applied to a horizontal water main 22 in which the water flow may be controlled by any suitable means. In this arrangement the tanks and conduit connections therebetween and the water main 22 are somewhat the same as previously described for Figure 1, except that in the arrangement of Fig. 2 pressure by-pass is provided between two spaced points in the main 22.

In Fig. 2 the jet is not inserted in the water main 22 but, instead, is inserted in a shunt conduit 23 which may be connected, as shown, to the water main 22 and provided with control valves 24 and 25. This shunt conduit 23 is provided with a restricted nozzle 26 extending into a pressure reduction space 27 in the same manner as previously described for Figure 1. The outlet conduit 12a from the solution tank 10a is connected to this pressure reduction space 27 at 28 in substantially the same manner as previously described.

In this construction the pressure in the water main 22 will cause a water pressure to be exerted in the air drum 7a until entrapped air in the upper portion of the tanks 7a and 10a and in the conduit 11a is compressed equivalent to the pressure of the water. This pressure is exerted against the solution in the tank 10a which is forced through the strainer 13a and, assisted by the suction due to reduced pressure in the chamber 27, enters the conduit 23 and therethrough into the water main 22. When water is not flowing in the main 22, the pressure is equalized in the conduit 23 and the pressure therefrom seats the check valve 15a and prevents any flow of solution from the tank 10a.

Referring again to Figure 1, the height of the solution in the solution tank 10 is constantly indicated by the gauge glass 21, and when it is necessary to refill the solution tank the valve 9 leading from the main 1 to the air tank 7 is closed and the valve 18 is opened to drain the water from the air tank 7. The valve 20 at the top of the solution tank is also opened and the required amount of solution is poured in through the funnel 19. The valves 20 and 18 are then closed and the valve 9 opened, and the device is again ready for automatic operation. The same process is followed in filling the device shown in Fig. 2 after closing the valves 24 and 25. When the water is being drained from the tank 7, and it is desired to add liquid to the tank 10 at the same time, then a valve 11b may be opened to the atmosphere, otherwise the suction caused by the water discharging from the tank 7 may cause some of the liquid being poured through the funnel 19 to be drawn over into the tank 7 thus creating waste of this liquid. The valve 11c in Fig. 2 serves the same purpose.

As previously stated, the invention herein disclosed is adaptable for use in connection with any suitable water storage tank, such as used for supplying grailway locomotives. In this connection either the arrangement shown in Fig. 1 or that shown in Fig. 2 may be used. In Fig. 1 is illustrated a storage tank 29 into which the conduit 3 extends and which is provided with a valve 30. The valve may be automatically controlled by a float 31 on an arm 32 connected with the valve stem. This automatic valve control may be of any of the usual well known types whereby a desired water level may be constantly maintained in the tank. It will be apparent that in this construction the flow of solution will be automatically varied or stopped in accordance with the operation of the level control valve 30 in the tank 29, and that the flow of solution from the tank 10 into the main 1 will be governed accordingly and a predetermined ratio of solution to water can be maintained in the storage tank 29 at all times.

Further modifications will be apparent to those skilled in the art, and it is desired, therefore, that my invention be limited only by the prior art and the scope of the appended claims.

Having thus described my invention, what I claim and desire to secure by Letters Patent is:

1. In an automatic solution-feeding device of the character described, the combination with a water main carrying water under pressure and having a restricted portion in said main forming an extension in the direction of flow, said main forming a suction chamber below the end of said extension and providing a reduced pressure intake, a solution reservoir positioned below said intake and connected thereto by a restricted passage, a check valve in said passage to prevent flow to said reservoir, an air reservoir communicating with the upper end of said solution reservoir, the lower end of said air reservoir also communicating with said main at a high pressure point remote from said suction chamber, the ratio of the volume of said air reservoir to said solution reservoir being approximately 5 to 1.

2. In an automatic solution-feeding device for the purpose described, the combination with a water conduit carrying water under pressure and having a restricted portion forming an extension nozzle in said main extended in the direction of flow, a relatively large suction chamber around said extension to provide a large reduced-pressure intake around the end of said nozzle, a solution reservoir positioned entirely below said suction chamber and connected thereto remote from the end of said extension by a restricted passage, a check valve in said passage to prevent flow to said reservoir, an air reservoir communicating with said solution reservoir, said air reservoir also communicating with said conduit at a high pressure point remote from said suction chamber.

3. A solution-feeding device, comprising a water conduit having a restricted nozzle forming an extension in the direction of pressure flow, said nozzle having a suction chamber adjacent thereto and communicating with said conduit adjacent the end of said nozzle, a solution chamber positioned below said nozzle, a conduit communicating with the bottom of said solution chamber and with said suction chamber rearwardly of the end of said nozzle, and an air reservoir having its upper end communicating with the upper end of said solution chamber and its lower end communicating with said water conduit at a high pressure point remote from said nozzle, said air reservoir being of sufficiently greater capacity than said solution reservoir that the volume of air trapped in the air reservoir under pressure when said solution reservoir is full is greater than the capacity of said solution reservoir.

4. A solution feeder of the character described comprising a high pressure water conduit, a vena contracta in said conduit, a solution tank below said vena contracta, a solution channel from the lower end of said solution tank to a low pressure region produced by said vena contracta, an air tank at substantially the same level as said solution tank but of materially greater capacity, a water channel from a high pressure point in said water conduit to the lower end of said air tank, an air channel between the upper ends of said tanks and extending a material distance above said solution tank, said tanks and said channels being constructed and arranged to maintain trapped air above said solution and a total volume of air between the low pressure solution outlet and the high pressure water inlet materially greater than the capacity of said solution tank and said air channel.

LOUIS B. PAINE.